July 29, 1969     O. MUSGRAVE     3,457,798

TRANSMISSION UNIT

Filed Sept. 25, 1967     3 Sheets-Sheet 1

INVENTOR
ORLY MUSGRAVE
BY Jerome P. Bloom
ATTORNEY

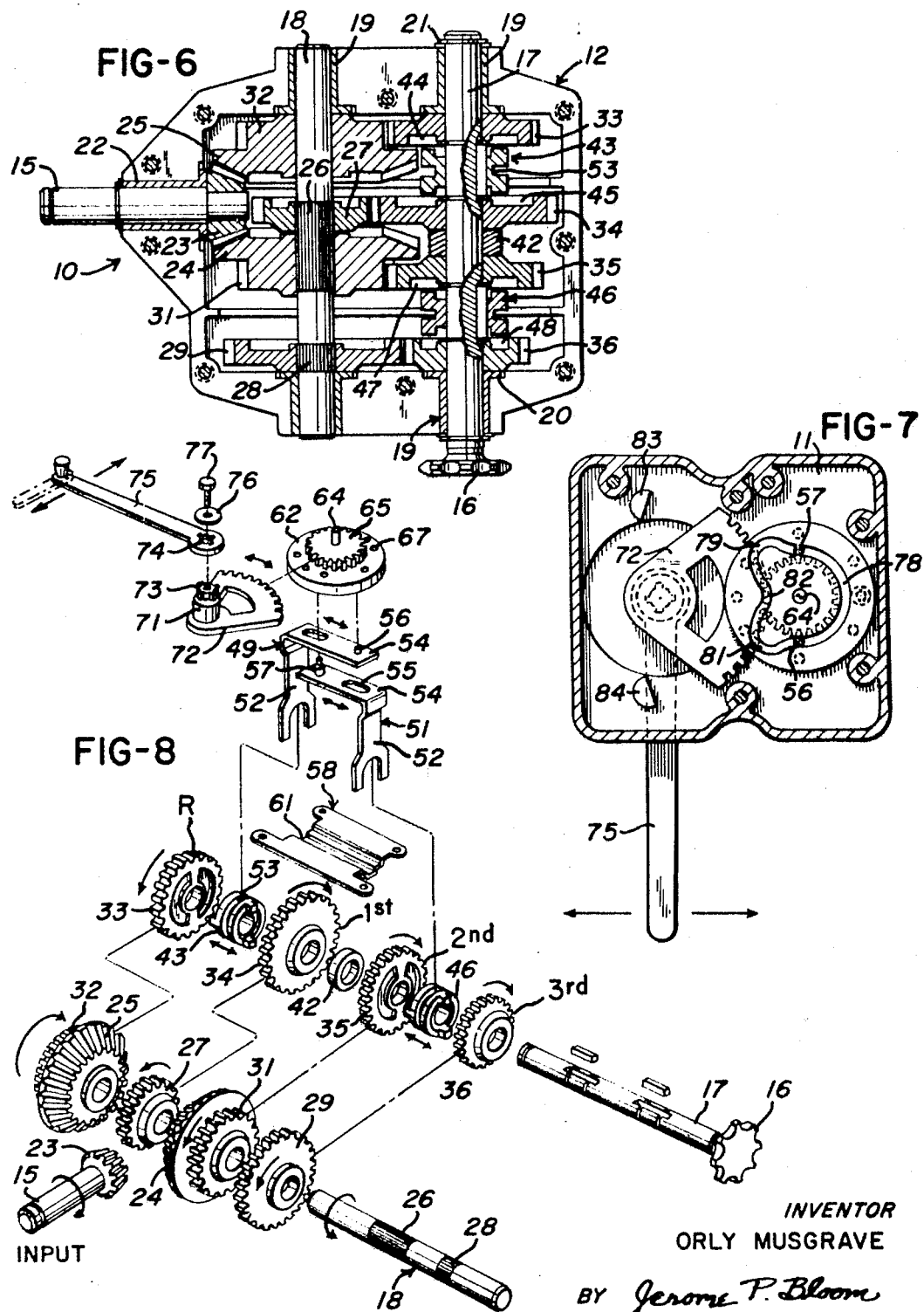

July 29, 1969  O. MUSGRAVE  3,457,798
TRANSMISSION UNIT
Filed Sept. 25, 1967  3 Sheets-Sheet 3
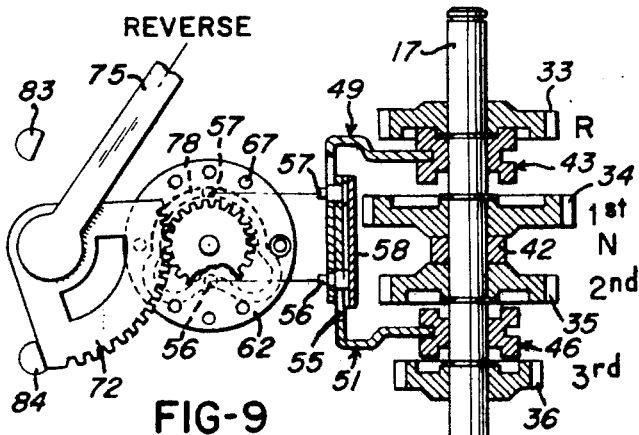
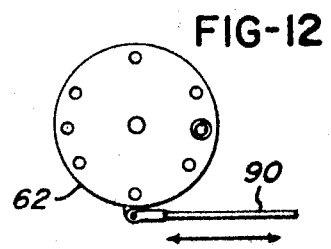
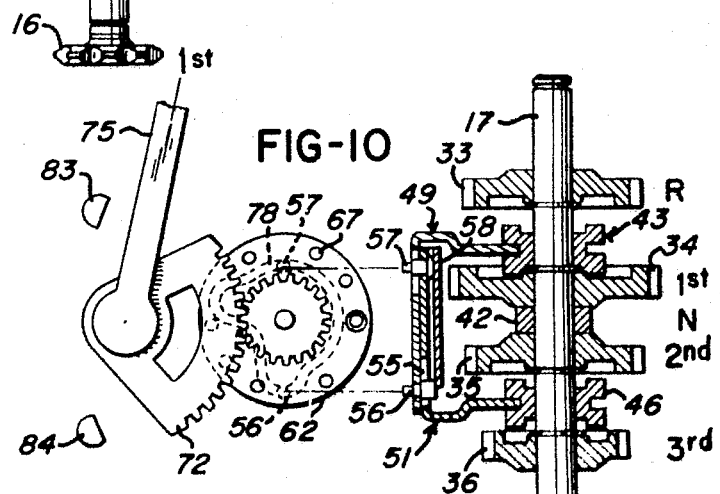
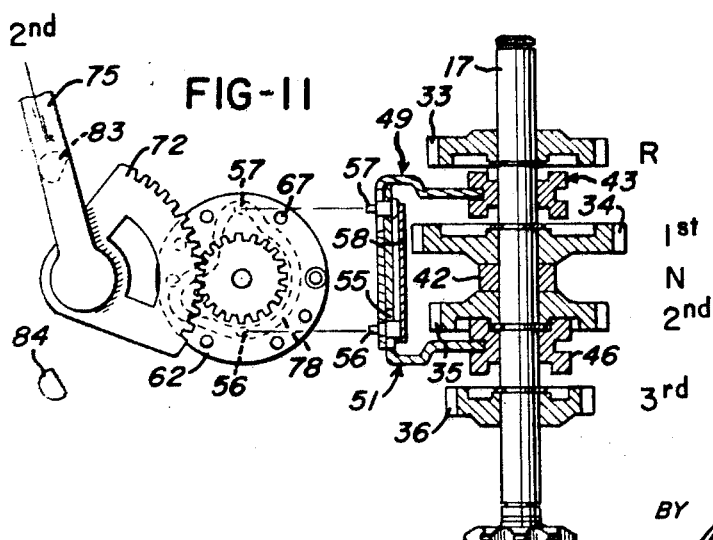
INVENTOR
ORLY MUSGRAVE
BY Jerome P. Bloom
ATTORNEY United States Patent Office 3,457,798
Patented July 29, 1969

3,457,798
TRANSMISSION UNIT
Orly Musgrave, Springfield, Ohio, assignor to The Mast-Foos Manufacturing Company, Inc., Springfield, Ohio, a corporation of Ohio
Filed Sept. 25, 1967, Ser. No. 670,059
Int. Cl. G05g 9/06; F16h 5/10
U.S. Cl. 74—473                                    10 Claims

ABSTRACT OF THE DISCLOSURE

A shift lever rotatable in a single plane rotates a cam via gearing. A pair of reciprocable cam followers connected to a pair of shift forks cause reciprocation of clutch elements in response to movement of the shift lever. The clutch elements activate change speed gearing to establish various gear ratios.

---

This invention relates to an improved transmission unit having a unique control mechanism. Embodiments are not only more efficient and satisfactory in use but also more readily applicable in a compact form and in a great variety of applications.

For purposes of illustration, and not by way of limitation, the invention is here described in reference to an embodiment which is particularly advantageous in application to a riding mower or other tractor-type farm vehicle.

The features of the present invention are particularly distinguished when considering multi-speed gear transmission units of the prior art which employ a manual gearshift. Such units conventionally include a shift lever which must be variously moved in a complex pattern to couple its input (gear) to a selected gear train whereby to selectively achieve a desired output, for example, a reverse drive or a selective drive at one of an available plurality of forward speeds. The pattern is invariably such to require both lateral and longitudinal displacement of the shift lever. Many people find the pattern so complex that it is difficult to learn. Oftentimes even those people quite familiar with the operation of the shift lever have a tendency to shift improperly. In either event, inadvertent damage or injury can easily result. There is yet another problem inherent in use of the prior art transmission units of the type described. They require an undue amount of space to accommodate their control mechanism and the various diverse movements of their shift levers. Furthermore, the characteristics of the conventional control mechanism has made it difficult and even impractical to exercise a shift lever by remote control.

Use of the present invention obviates the above problems. It produces a more compact and more simply operable transmission unit featuring unique control mechanism. It embodies in a transmission unit of the type described a simple cam device a fractional rotation of which is capable of achieving a variety of outputs. Such cam device and its related control mechanism is simply shifted by a minimal application of force through a prime mover which, in a preferred embodiment, is in all instances limited to a single undeviating path. These and other elements of improved structure inherent in the invention embodiments will become more apparent from the preferred embodiments thereof which are herein described.

A primary object of the present invention is to provide an improved transmission unit which may be economically fabricated, more efficient and satisfactory in use, adaptable to a wide variety of applications and unlikely to cause malfunction.

A further object of the invention is to provide improved controls for a gear transmission unit facilitating the use thereof in a minimal amount of space.

Another object of the invention is to provide a transmission unit with a basically simplified control pattern.

An additional object of the invention is to provide a generally new and improved transmission unit the controls of which are simplified as to construction and operation and the output of which is dictated by movement of a control member in a single undeviating path.

Another object of the invention is to provide improved controls for gear transmission units which facilitate their operation, if so desired, by remote control.

A further object of the invention is to provide an improved transmission unit featuring a unique camming mechanism for dictating a selective output.

Another object of the invention is to provide a unique drive selector system for a gear transmission unit featuring a control element having a single limited path of operation and in operative conection therewith means defining an operator having a single limited relatively undeviating control path.

Another object of the invention is to provide transmission units and controls therefor which are particularly advantageous for use in motorized vehicles.

An additional object of the invention is to provide a transmission unit and controls therefor possessing the advantageous structural features, the inherent meritorious characteristics and the means and mode of operation herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the drawings wherein preferred but not the only embodiments of the invention are here illustrated, FIG. 1 is a perspective view of a transmission unit in accordance with the present invention;

FIG. 6 is a view taken on line 6—6 of FIG. 3;

FIG. 7 is a view on line 7—7 of FIG. 3;

FIG. 8 is an exploded view of the transmission unit of FIG. 1;

Figure 1:
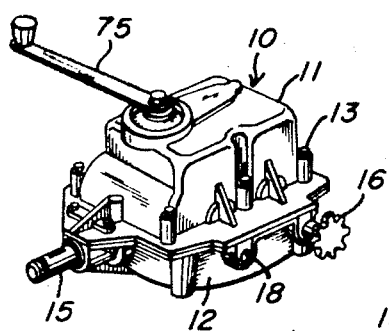

FIGS. 9, 10, and 11 are generally diagrammatic views illustrating the control elements which provide a drive selector means for the change speed unit of FIG. 1 in respectively reverse, first and second control positions; and FIG. 12 is a schematic illustration of a further embodiment of the present invention.

Like parts are indicated by similar characters of reference throughout the several views.

By way of illustration the invention is here disclosed as providing a compact multi-speed gear transmission unit such as used in riding mowers. It is to be understood, however, that neither the described embodiment nor any other which utilizes the illustrated concepts is so limited as to form or application.

As seen in the drawing, the transmission housing 10 is comprised of upper and lower mating half shells 11 and 12 the mating edges of which are externally flanged. The flanges are clamped together by bolts 13. Housing 10 forms a lubricant filled cavity 14 which accommodates change speed gearing selectively powered by way of an input shaft 15. The shaft 15 projects from one end of the housing 10 and is suitably adapted for coupling thereof to a prime mover.

Internally thereof the housing 10 is transversely bridged by spaced parallel shafts 17 and 18. End portions of the shafts 17 and 18 are respectively accommodated in sleeve bearings 19. The latter nest in pairs of transversely aligned recesses formed in the upper flanged edge portions of the shell 12. The innermost end of each bearing 19 has an external flange 20 nesting in complementary recesses in the portions of the shells 11 and 12 which define the inner wall of the housing 10. As it projects inwardly of the housing, the input shaft 15 is rotatably accommodated in a similar sleeve bearing 22 having at its inner end a flange serving as an abutment for the base of a bevel gear 23. The later fixedly mounts to and coextensively with the reduced and relatively short innermost end of the input shaft 15.

As shown, the shafts 15, 17 and 18 occupy a common plane and the shafts 17 and 18 dispose at right angles to the shaft 15. Further, the shaft 18 is most adjacent and in closely spaced relation to the bevel gear 23 and the shaft 17 has one end thereof projected to fixedly mount a drive sprocket 16 to one side of and external to the housing 10. Each shaft is suitably restrained from an axial movement in respect to the housing 10 by conventional means the details of which are not per se pertinent to the invention and are therefore not described.

Looking to FIG. 8 of the drawings, and reading from left to right, the shaft 18 successively mounts a spur 32 which has formed integral with and projected from its innermost face a bevel gear 25, a small spur gear 27, a bevel gear 24 which has formed integral with its remote face a spur gear 31, and finally a spur gear 29. The gear 32 has a slightly projected hub portion which bearingly abuts the adjacent flange 20 of a bearing 19 for the one end of the shaft 18. At the same time, bevel gear 25 is in continuous mesh with the input gear 23 fixed on the adjacent end of the input shaft 15. The integrated unit including the gears 32 and 25 mounts for free rotation about the shaft 18. On the other hand, gear 24 which is also in continuous mesh with the input gear 23 and its integrated spur gear 31 have a fixed relation to the shaft 18. This last is achieved by a press fit of the gear unit on a serrated shaft portion 26. The gear 27 is similarly connected to rotate with the shaft 18 as is the spur gear 29 which connects through the medium of a serrated shaft portion 28. The face of gear 29 most remote from gear 33 has a slightly projected hub portion bearingly related to the adjacent flange 20 of a sleeve bearing 19 accommodating the other end of the shaft 18.

Still referring to FIG. 8 in the same sense, the output shaft 17 successively mounts a relatively rotatable spur gear 33, a driving dog 43 keyed thereto for an axial but non-rotating shifting motion, a relatively rotatable large spur gear 34, an annular spacer 42, a relatively rotatable spur gear 35, a driving dog 46 connected similarly to the dog 43, and, finally, a spur gear 36. The remote faces of the gears 33 and 36 have projected hub portions which bearingly abut adjacent flange portions 20 of the sleeve bearings 19 which rotatably accommodate remote portions of the output shaft 17. As seen in FIG. 6 of the drawings, lock rings are conventionally employed in groove portions of the shaft 17 to radially project and contain the gears 32 through 36 inclusive against an axial shift.

Referring again to FIG. 6, it may be there seen that gears 32 and 33 are in continuous mesh as are gears 27 and 34. Also in continuous mesh are gears 31 and 35 and the gears 29 and 36. Note that the driving dogs 43 and 46 are here shown in a neutral position, centered respectively between gears 33 and 34 in the one case and between gears 35 and 36 in the other case. As will be evident, the respective end faces of each of the dogs 43 and 46 have circularly spaced projecting lugs which are in a general axial alignment with complementary, relatively enlarged, recesses in the most adjacent faces of the adjacent gears. These recesses in the gears 33 through 36 inclusive, the purpose of which shall soon become obvious, are respectively identified by the numerals 44, 45, 47, and 48. Each dog is provided also with a centrally located peripheral groove 53, the purpose of which will be further described.

With reference to the control mechanism for the aforementioned gearing, the shell 11 has in the top thereof, adjacent the end from which projects the input shaft 15, a through opening 69. The opening 69 receives a hub 71 which is integral with and upstanding from the apex of a pie-shaped gear segment 72. The hub 71 has a reduced upper extremity 73 of irregular peripheral configuration which projects from the shell 11 and through a complementary opening 74 in one end of a control lever 75. A screw 77 projected through a large washer 76 and the opening 74 threadedly engages in the upper end of hub 71 to clamp the lever 75 in a fixed relation to the gear segment 72. The so-anchored end of the lever 75 overlaps and peripherally rests in a bearing relation to the surface portion of the shell 11 surrounding its through opening 69. The gear segment 72 is fixed thereby to rotate in a plane located immediately under the topmost portion of the shell 11.

The projected relatively expanded arcuate end of the segment 72 is formed with gear teeth which mesh with a coplanar spur gear 65. The later is formed integral with and projected from the uppermost face of a cam plate 62. A pin 64 is fixed in the center of the plate 62 to project vertically therefrom, on its central axis. The pin 64 rotatably bears in a complementary recess formed in a hub-like projection which depends from the top portion of the shell 11.

The cam groove 66 is formed in the undersurface of the cam plate 62. As seen in FIG. 7, the portion 78 of the cam groove 66 which is most remote from the gear element 72 occupies an approximately 180° arc of uniform radius. The remainder of the groove 66 most adjacent the gear teeth of the segment 72 is formed as two identical divergent lobes 79 and 81. These lobes mutually define, intermediately thereof, at a point in a line connecting the centers of the hub 71 and the pin 64, a relatively indented groove portion 82. The remote extremities of the lobes 79 and 81 are therefore defined by the respective ends of the groove portion 78 and the central point defined by the groove portion 82. The radial displacement of the groove portion 82 is obviously less than the length of the radius of the arc of the groove portion 78. Thus, groove 66 is formed to be symmetrical about a center line drawn through the aforementioned centers of hub 71 and pin 64.

Interposed between the cam plate 62 and dog 43 and dog 46 are a pair of actuating members 49 and 51 forming a yoke. Referring to FIG. 8, member 49 has the general shape of a right angle, including, in the example shown, a horizontally disposed plate-like arm portion 54 and in a generally vertical dependent relation to one end thereof a leg portion 52. Immediately under the arm portion 54 the lower end of the leg portion 52 is offset in a sense inwardly of the arm and its dependent extremity is bifurcated to provide dependent fingers. Such fingers are formed thereby to nest in diametrically opposite portions of the groove 53 in the dog 43.

A slot 55 is formed in the end of the arm portion 54 most adjacent the leg portion 52. Slot 55 is elongated in the direction of the arm. A stud 56 is fixed in the end of the arm 54 most remote from the leg 52 to project therefrom in a vertical sense. Referring to the neutral position of the controls seen in FIG. 7, in such instance the stud 56 nests in the groove 66 at the end of its lobe portion 81 which is most remote from the lobe portion 79.

The actuating member 51 has a form identical to that of the member 49. However, this horizontal arm portion 54 is disposed in an underlying relation to and directed in a sense opposite to the arm portion 54 of the member 49. In this case the vertically projected stud, identified by the numeral 57, projects through the slot 55 in the overlying portion of the member 49 and into the groove 66. As seen in FIG. 7, studs 56 and 57 are arranged to be diametrically opposed at the remote extremities of the groove portions 79 and 81. As shown, the dependent leg portion 52 of the actuating member 51 is parallel to and remote from the leg portion 52 of the member 49 and the fingers formed by its bifurcated extremity nest in diametrically opposed portions of the groove 53 in the dog member 46.

The actuating members 49 and 51 are held in position for a bearing relation therebetween and for selective sliding displacement by means of the retainer plate 58. The latter has a central depression 61 accommodating a nesting therein of the superposed arm portions 54 while its lateral extremities are bolted in flush engagement to topmost portions of the shell 11.

Figure 2:
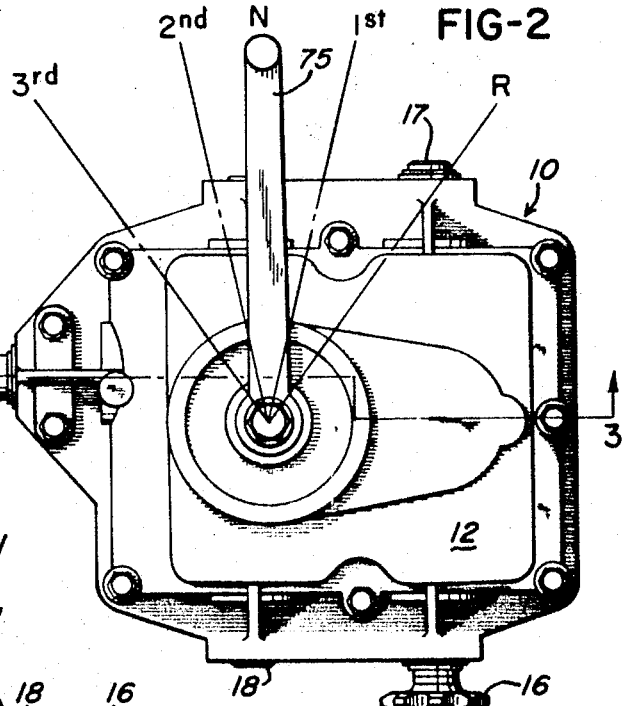
FIG. 2 is a relatively enlarged top view of the transmission unit.
Figure 4:
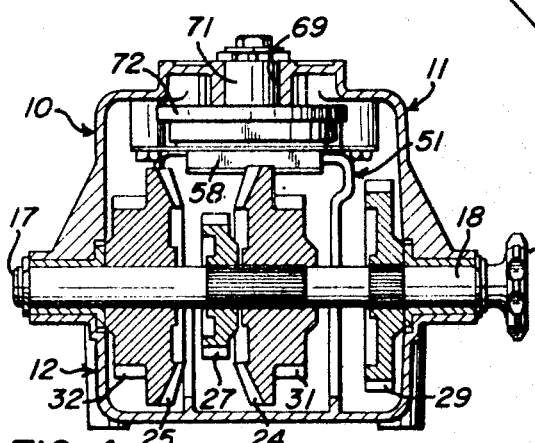
FIG. 4 is a sectional view on line 4—4 of FIG. 3.
Figure 3:
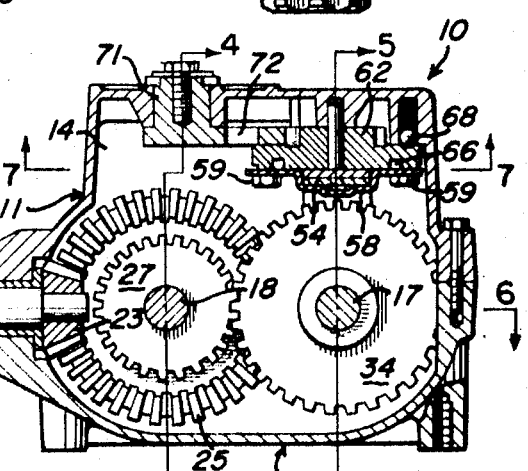
FIG. 3 is a view taken on line 3—3 of FIG. 2.
Figure 5:
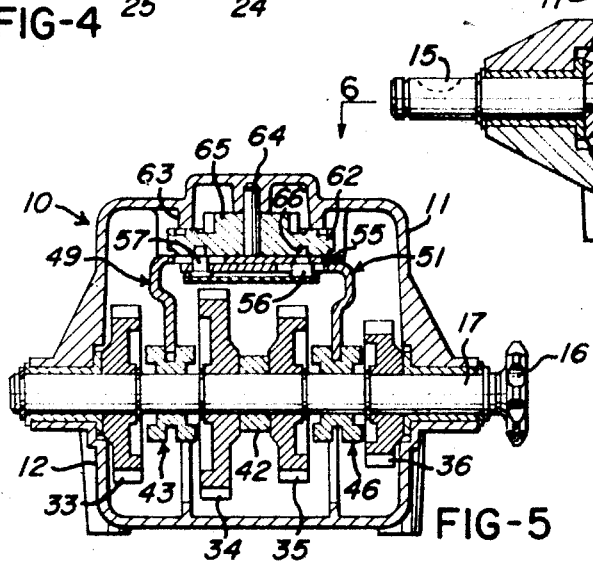
FIG. 5 is a sectional view on line 5—5 of FIG. 3.

As will be described, in the operation of the illustrated transmission unit, the lever 75 may be moved in short increments of motion, limited to a single plane, to induce corresponding movements of the cam plate 62 and to thereby selectively shift the dog 43 or the dog 46 a selected increment along the shaft 17. This effects a gear train which converts the available input at 15 to a desired output at 16 in a manner believed obvious. In the process, the plate 62 may achieve any one of a plurality of defined stations each of which signals the achievement of a position dictating a selected output. In this respect, the uppermost surface of plate 62 is formed with a circularly spaced series of sockets 67. As the disc is rotated to a position dictating a selected output, one of these recesses registers with spring biased ball 68 contained in a recess in a top portion of the shell 11. The ball 68 drops into the aligned socket to releasably lock the plate 62 in its selected position. The locking action is smooth as lever 75 defining a moment arm is pivoted to its defined station marked on the shell 11 in a manner such as shown in FIG. 2. The lock holds until a force is once more applied to move the lever 75. As this occurs, there is a smooth and quick displacement of the plate, the turning of which causes the ball 68 to be cammed from and to ride up out of the socket 67. If circumstances so dictate, in moving from one station to another with force applied to the moment arm provided by lever 75, the plate 62 may similarly cause a socket 67 to easily pass the detent afforded by the spring biased ball 68.

In the change speed unit here described there may be marked on the top of the shell 11, as above indicated, the symbols representing neutral, reverse and three speeds, this being the available range of the illustrated transmission unit. Note that when lever 75 is moved to indicate any one of these symbols the distance of its swing will be quite short. Correspondingly, the disc-shaped plate 62 will have only a small increment of motion to achieve the selected station at which point ball 68 will drop into a socket to hold the plate until force is once more applied to change the position of the lever.

The limited swing required of the lever arm 75 as it moves through its entire operating range provides that the point of the applied force moves through a single, short, undeviating slightly arcuate path which affords an essentially straight line movement. Accordingly, taking particular note of the drawings, a rod or other linearly acting member may be connected to apply the required force to the outer end of the lever arm. In such case, this rod, being pivotally connected, will in the movement thereof to select the drive condition of the transmission unit function in an essentially straight line pattern.

It has been shown in the preferred example illustrated that an optimal drive of the cam 62 is effected through lever 75 and by way of the gear segment 72 and the connected pinion 65. In the alternative it has been indicated that a linearly acting control member may be connected to the outer end of the lever. Further, in other instances a linearly acting control rod or cable or like operating member may be applied directly to the cam plate 62 for operation thereof in an obvious manner apparent from the diagrammatic illustration in FIG. 12 of the drawings. Here the linearly acting control member 90 is attached to a peripheral point on the cam plate to achieve a necessary moment arm through which the force applied must be transmitted to index the cam plate to a desired station.

Turning to diagrammatic FIGS. 9 to 11 of the drawings, these illustrate the positioning of the lever 75 to respectively achieve through the transmission unit a reverse drive, a first speed and a second speed. The shafts 17 and 18, of course, and the gears thereon offer multiple transmission paths for an input delivered through the shaft 15. In the example illustrated, by virtue of their mounting, diameter and arrangement of their teeth, the gears on shaft 17 assume respectively the character of a reversing gear 33, a first forward speed gear 34, a second forward speed gear 35 and a third forward speed gear 36. Note that in the neutral position of lever 75 the dogs 43 and 46 are fully disengaged from these gears.

To achieve reverse drive (FIG. 9) lever 75 may be advanced to the symbol R through its first (1st) forward speed position. In such instance gear segment 72 is rotated to one extreme defined by an abutment of one side thereof to a stop 84 fixed in the shell 11. In the process, cam plate 62 is rotated to position follower studs 56 and 57 respectively at point 82 of groove 66 and at a diametrically opposite point centered in the groove section 78. Through the medium of stud 56 the member 49 is moved thereby to displace its leg portion 52 from the leg portion 52 of actuating member 51, to the extent permitted by the slot 55 in the member 51. Resultingly, the dog 43 is axially shifted to clutch to gear 33. In such case there is a drive effected from input gear 23 to bevel gear 25, gear 32 and gear 33, and through the dog 43 to shaft 17 and sprocket 16. In this manner the drive from the transmission unit is reversed from normal.

In effecting a gear train to achieve an output corresponding to a first forward speed, lever 75 would be moved to the appropriate position indicated in FIG. 2. In such case gear segment 72 is displaced halfway from neutral to the aforementioned extreme position. This correspondingly effects a small increment of adjustment of the cam plate 62 whereupon the follower stud 56 positions at the peak of the lobe 81 and stud 57 positions diametrically opposite in a portion of the groove section 78. Through the medium of stud 56 the actuating element 49 pulls dog 43 into a clutching engagement with gear 34. In this manner a drive is created which leads from shaft 15 to shaft 18 by way of bevel gear 24. Shaft 18 drives gear 34 by way of gear 27. Since gear 34 is clutched, it then drives the shaft 17 and output sprocket 16 by way of the dog 43.

Similarly one achieves the second forward speed as illustrated in FIG. 11. In this case lever 75 is moved to 2nd the movement being in a direction opposite to that achieveing first but in the same undeviating path. Correspondingly, while stud 56 is neutralized, stud 57 is cammed to an outer point of lobe 79, shifting dog 43 to neutral and dog 46 to a clutching engagement with gear 35. A drive is now effected through bevel gear 24, spur gear 31, gear 35 and by way of dog 46 to shaft 17 and sprocket 16. This produces the gear train achieving the second forward speed. To achieve the various speeds require, of course, appropriately sized gears and the proper number of teeth thereon.

The third forward speed is achieved similarly and in a manner obvious from the above.

In any event the movements of lever 75 and cam plate 62 to operate the follower studs 56 and 57 and thereby achieve the desired drive condition by relative shift of the actuating members are in small increments and in a single undeviating path or pattern. The simplicity and effectiveness of the straight line control so enabled is unique. The operating action in selecting and achieving the required drive is simple, brief and yet completely positive. The movements of the apparatus are so limited as to require a minimal amount of operating space. Thus, not only is the invention structure compact per se but it fits in a small amount of space, enabling thereby that any vehicle embodying the invention control features may be made more compact, and without affecting its dominant design requirements. Economy and efficiency is inherent therein.

The invention further keynotes a simplicity of construction and ease in assembly of its various embodiments. It will be obvious therefore that the application of the invention is particularly desriable where simplicity of operation is of singular importance. Most important, the minimal movements of the control elements of the invention apparatus facilitate remote control thereof in a manner not heretofore possible utilizing the control features of transmission units of the prior art.

From the above description it will be apparent that there is thus provided a device of the character described possessing the particular features of advantage before enumerated as desirable, but which obviously is susceptable of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into affect.

Having thus described my invention, I claim:

1. A transmission unit comprising means for receiving and transmitting an input, means for converting said input to a driving impulse of selected form, means for selectively coupling said input to said converting means to produce a selected driving impulse and control means for such coupling means having a plurality of control positions, each of which dictates a selected operation of said coupling means to produce the desired driving impulse, an element of said control means moving in a single relatively undeviating path as it moves from one to another of its control positions, said coupling means having in connection therewith shifting means constituting a part of said control means and a rotary cam constituting another part of said control means, said cam including means defining a continuous surface of arcuate configuration, there being means operatively connected with said arcuate surface to operate said shifting means in response to rotary movement of said cam to achieve a selected driving impulse dictated by means of a slight increment of motion of said element in said path to one of said control positions.

2. A transmission unit as in claim 1 wherein said coupling means are movable in one path and said control means have in connection therewith an operator movable in another path in a sense generally crosswise to said one path.

3. The structure as set forth in claim 1 characterized by said control positions all lying in a single straight path and within the range of a limited fraction of the rotary motion possible with a full rotation of said rotary cam.

4. A transmission unit, including a housing having accessible from the exterior thereof input and output shafts and a rotary control member, selector means outside said housing fixed to said control member and restricted thereby to a single line motion in which incremental rotary impulses are imparted to said control member, a cam within said housing connected to rotate with said control member, said cam having a continuous control surface of arcuate contour, shift mechanism in said housing in a following relation to said cam control surface, and drives of differential speed and direction in said housing between said input and output shafts selected by adjustment of said shift mechanism, the full range of which is produced in the course of a short single line motion of said selector means.

5. A transmission unit according to claim 4, wherein said cam surface is symmetrical about a line passing through the axis of said control member and of said cam, said shift mechanism comprising a pair of shift members having respective cam follower portions in diametrically opposed relation to one another.

6. A transmission unit according to claim 5, characterized in that said cam surface is in the form of a groove, said shift members having the form of forks with overlapping planar portions each having an upstanding stud thereon, said cam overlying said shift members with said groove in a facing relation thereto, said studs being received in said groove.

7. A transmission unit according to claim 6, characterized in that said drives in said housing include a shaft having gears thereon and clutches shiftable selectively to connect said gears to said shaft, forked portions of said shift members engaging respective clutches.

8. A transmission unit according to claim 5, wherein said control member is installed in a wall of said housing, said cam being adjacent said wall, a face of said cam having a groove therein forming said cam surface and an opposite face thereof having a circumferential series of detent positions, detent means installed in said wall co-operating with said detent positions, incremental rotary positions of adjustment of said control member being defined by said detent positions.

9. A transmission unit according to claim 4, characterized in that said selector means is a lever adjustable in opposite directions from a neutral position in incremental steps to a plurality of control positions and the control surface of said cam being symmetrical about a line passing through the axis of said control member and of said cam, said shift mechanism providing a pair of diametrically opposed spaced apart followers in common engagement with said cam surface.

10. A transmission unit according to claim 9, characterized in that said control surface is a continuous groove in a face of said cam, said groove providing over approximately half of its configuration an arcuate portion substantially concentric relative to the cam axis, and providing over the remainder of its configuration a pair of lobes separated by a recessed portion having a radius less than that of said arcuate portion, a neutral position of said selector means positioning said cam to receive said followers substantially at respective ends of said arcuate portion, rotary movement of said cam in either direction causing one of said followers to enter into one of said lobes and position therein or to pass through and beyond the lobe into said recessed portion, while the other follower remains in said arcuate portion.

References Cited

UNITED STATES PATENTS

| | | | |
|---|---|---|---|
| 1,693,645 | 12/1928 | Fahrney | 74—337.5 X |
| 1,715,178 | 5/1929 | Tredway | 74—337.5 X |
| 1,721,672 | 7/1929 | Schmidt | 74—473 |
| 2,003,794 | 6/1935 | Van Degrift | 74—337.5 X |
| 2,772,652 | 12/1956 | Du Shane et al. | 74—473 X |

MILTON KAUFMAN, Primary Examiner

U.S. Cl. X.R.

74—337.5, 475